H. NESTESTU.
INDEPENDENT TOOTH BAR HARROW.
APPLICATION FILED MAR. 31, 1909.
929,160.
Patented July 27, 1909.
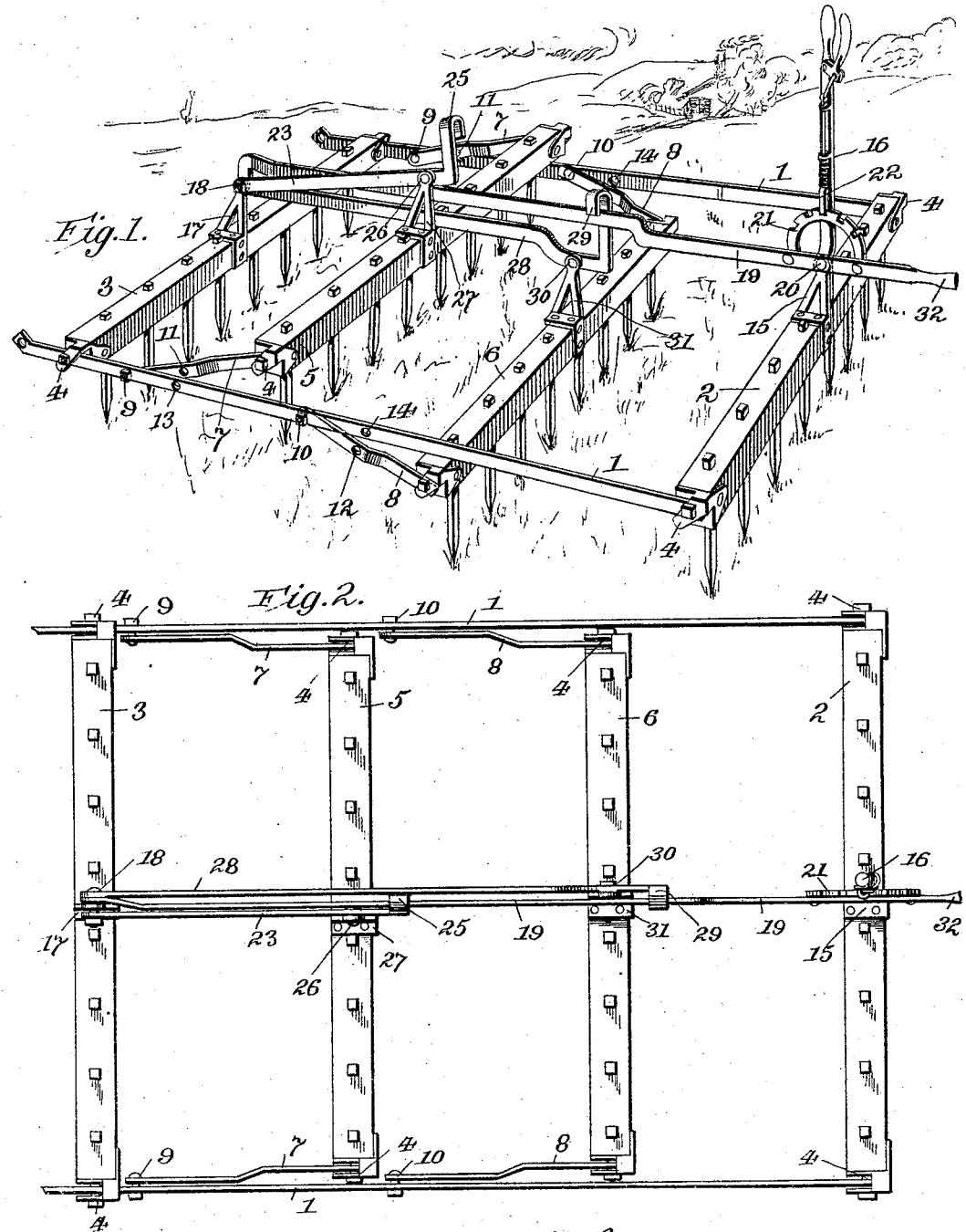
INVENTOR,
Henry Nestestu,

UNITED STATES PATENT OFFICE.

HENRY NESTESTU, OF COTTAGE GROVE, WISCONSIN.

INDEPENDENT-TOOTH-BAR HARROW.

No. 929,160.    Specification of Letters Patent.    Patented July 27, 1909.

Application filed March 31, 1909. Serial No. 486,938.

*To all whom it may concern:*

Be it known that I, HENRY NESTESTU, a citizen of the United States, residing at Cottage Grove, in the county of Dane and State of Wisconsin, have invented certain new and useful Improvements in Independent-Tooth-Bar Harrows, of which the following is a specification.

My invention relates to independent tooth bar harrows and has for its object the provision of a construction of harrow in which the tooth bars may move independently of each other; may be set at any desired angle and approximately preserve the same in their independent motions, and in which the various tooth bars may be lifted from the ground successively.

A further object is to provide a simple and efficient means for converting the harrow to one of the rigid type when desired.

The invention is fully illustrated in the accompanying drawings, in which—Figure 1 is a perspective view of the entire apparatus, showing one tooth bar in a raised position and another tooth bar in a lowered position; Fig. 2 is a plan view of the entire harrow; and Fig. 3 is a detail view of the end of one of the tooth bars, showing a hanger joint.

By reference to Figs. 1 and 2 it is to be seen that the harrow has no frame aside from the two side bars 1. Pivoted near the ends of the side bars 1 are tooth bars 2 and 3, the pivotal connection being had by means of the hangers 4, essentially identical in each case and illustrated in detail in Fig. 3. The intermediate bars 5 and 6 are pivotally mounted at the extremities of the links 7 and the links 8, respectively, which links are in turn pivoted to the side bars 1 at 9 and at 10. The pivotal connection between these links and the side bars may be formed by means of rivets or bolts or in any other desirable manner. It will be noted that the links 7 and 8 are further provided with the holes 11 and 12, and that the side bars 1 are provided with corresponding holes 13 and 14, and that the insertion of bolts through these holes would prevent any movement of these links about the pivots 9 and 10. This is the means provided for the conversion to a rigid harrow.

The angular adjustment of the tooth bars to produce the desired angular position of the teeth carried thereon is effected by the following mechanism: Rigidly attached to the tooth bar 2 is a bracket 15 having an upward projection 16 serving as a lever handle. The bar 3 is provided with a bracket 17 rigidly attached thereto and having an upwardly projecting member terminating in a pivotal bearing 18. Pivoted in the bearing 18 is a link 19 which extends rearwardly and approximately horizontally, and is attached by means of a pivot 20 to the upwardly projecting portion of the bracket 15, carried on the bar 2.

The pivotal connections 18 and 20 are at approximately equal distances above the pivots by which the tooth bars are attached to the side bars, and the distance between the centers of the pivots 18 and 20, measured in the direction of the link 19, is the same as that between the pivots of bars 2 and 3, measured along the side bars 1. In this manner I secure a parallelogram and consequently parallel motion of the teeth in the bars 2 and 3 relatively to each other. Permanence of the angular adjustment of the tooth bar 2 and consequently also of the tooth bar 3 is secured by a notched sector 21 rigidly attached to the link 19 and engaged by a latch 22 mounted on the lever 16. The adjustment of the angle of the bars 2 and 3 simultaneously effects a like adjustment of the angularity of the teeth carried by bars 5 and 6, the following mechanism being provided to that end. Pivoted at 18 is a link 23 having an upwardly extending hook 25 formed on its end. This link is further pivoted at the point 26 to the upward arm of a bracket 27 similar to the bracket 17 and rigidly attached to the tooth bar 5. The height of the arm of bracket 27 is the same or approximately the same as that of bracket 17, and since the pivot 9 is located close to the pivot 4 I secure again an approximate parallelogram and consequent relative parallelism of the teeth of the bars 3 and 5. It is of course obvious that the non-coincidence of the pivots 4 and 9 makes this parallelism only approximate, but the variation is very slight within the usual limits of motion upward and downward of the bar 5 while in service. If however, such absolute parallelism is desired in all positions it might be secured by pivoting the links 7 at 4.

The adjustment of tooth angle for bar 6 is secured in a similar manner by means of a link 28 pivoted at 18 and also terminating in an upwardly projecting hooked portion 29. This link 28 is further pivoted at 30 to the upwardly projecting arm of the bracket 31 identical with bracket 27. The teeth carried on the bar 6 will of course have a motion deviating still farther from strict parallelism than those of the bar 5, because of the greater distance from pivot 4 to pivot 10, and the consequent difference in length of the links 8 and 28. It is nevertheless true that within the limits of motion of the tooth bar this deviation is slight enough to be neglected. Absolute parallelism might be secured, however, by making pivot 10 coincident with the pivot 4, as stated in the case of the bar 5.

In the use of the harrow it is sometimes desirable to raise only the rear tooth bar or the rear two tooth bars and so on, and I show means whereby this may be effected. The link 19 may be elevated by means of the handle 32 formed upon its rear end and the tooth bar 2 will be thereby lifted from the ground, the other bars remaining unaffected until the link 19 engages the hook 29 carried by the link 28. A continued raising of the link 19 will then lift also the bar 6 and a still further raising will cause the link 19 to engage the hook 25 on the link 23, lifting the tooth bar 5 with it. In this manner the tooth bars are successively lifted, the bar 3 alone remaining on the ground. It will be noted that the links 19 and 28 are provided with offsets, the purpose of these being merely to secure an additional clearance for the bars 5 and 6 in their upward motions and any form of offset adapted to secure this effect might be used.

It will be noticed that when the harrow is converted to the rigid type by means of bolts inserted in the holes provided for that purpose, the angular position of the teeth is still adjustable by the action of the lever 16.

I am aware that it is common to adjust the angle or slant of harrow teeth by means of a lever and link connection, and make no broad claim to such construction, my purpose being to secure this lever adjustment in a bar harrow having independent bars.

I do not intend to limit myself to the use of two intermediate tooth bars as shown and described, for the benefit of the invention would be equally well derived from a harrow following my construction and having but one intermediate tooth bar, or a plurality of such bars.

Having thus described my invention, what I claim is:—

1. An independent tooth bar harrow, comprising in combination side bars; toothed bars pivoted to the ends thereof; links pivoted to the side bars at intermediate points; toothed bars pivoted to said links; brackets rigidly attached to the toothed bars; links pivoted to the bracket of one toothed bar, each link being pivoted near its other extremity to the bracket of a different toothed bar; and means to lock one bracket and its attached link in a fixed angular relation.

2. An independent tooth bar harrow, comprising in combination side bars; toothed bars pivoted to the ends thereof; links pivoted to the side bars; toothed bars pivoted to said links; brackets rigidly attached to the toothed bars; links pivoted to the bracket of one toothed bar, each link being pivoted near its other extremity to the bracket of a different toothed bar; and means to lock one bracket and its attached link in a fixed angular relation.

3. An independent tooth bar harrow, comprising in combination side bars; toothed bars pivoted to the ends thereof; links pivoted to the side bars at intermediate points; means for rigidly connecting said links to the side bars; toothed bars pivoted to said links; brackets rigidly attached to the toothed bars; links pivoted to the bracket of one toothed bar, each link being pivoted near its other extremity to the bracket of a different toothed bar; and means to lock one bracket and its attached link in a fixed angular relation.

4. An independent tooth bar harrow, comprising in combination side bars; toothed bars pivoted to the ends thereof; links pivoted to the side bars; means for rigidly connecting said links to the side bars; toothed bars pivoted to said links; brackets rigidly attached to the toothed bars; links pivoted to the bracket of one toothed bar, each link being pivoted near its other extremity to the bracket of a different toothed bar; and means to lock one bracket and its attached link in a fixed angular relation.

5. An independent tooth bar harrow, comprising in combination side bars; toothed bars pivoted near the extremities thereof; links pivoted to the side bars; means for rigidly connecting said links to the side bars; toothed bars pivoted to said links; brackets rigidly attached to the toothed bars; links pivoted to the bracket of one toothed bar; each link being pivoted near its other extremity to the bracket of a different toothed bar; hooks formed on the end of the shorter links and adapted to engage the longest link as said longest link is lifted; and means to lock one bracket and its attached link in a fixed angular relation.

6. An independent tooth bar harrow, comprising in combination side bars; toothed bars pivoted near the extremities thereof; links pivoted to the side bars; toothed bars pivoted to said links; brackets rigidly attached to the toothed bars; links pivoted to the bracket of one toothed bar, each link being pivoted near its other extremity to the bracket of a different toothed bar; hooks formed on the end of the shorter links and adapted to engage the longest link as said longest link is lifted; and means to lock one bracket and its attached link in a fixed angular relation.

7. An independent tooth bar harrow, comprising in combination side bars; toothed bars pivoted to the ends thereof; links pivoted to the side bars; a toothed bar pivoted to said links; brackets rigidly attached to the toothed bars; links attached to the bracket of one toothed bar, each link being pivoted near its other extremity to the bracket of another toothed bar, and means to lock one bracket and its attached link in a fixed angular relation.

8. An independent tooth bar harrow, comprising in combination side bars; toothed bars pivoted to the ends thereof; links pivoted to the side bars; toothed bars pivoted to said links; brackets rigidly attached to the toothed bars; links pivoted to the bracket of one toothed bar, each link being pivoted near its other extremity to the bracket of another toothed bar; and means for locking said toothed bars in a fixed angular relation.

In testimony whereof I have signed my name to this specification in the presence of two subscribing witnesses.

HENRY NESTESTU.

Witnesses:
R. N. NELSON,
A. R. AMES.